UNITED STATES PATENT OFFICE.

FREDERICK AKERS, OF WEST CHESTER, NEW YORK.

IMPROVEMENT IN PROCESSES OF CLEANING BEANS, NUTS, AND OTHER ARTICLES.

Specification forming part of Letters Patent No. 155,693, dated October 6, 1874; application filed July 22, 1874.

*To all whom it may concern:*

Be it known that I, FREDERICK AKERS, of West Chester, Westchester county, in the State of New York, have invented a certain new and Improved Process for Cleaning and Polishing Beans, Nuts, and other Articles, of which the following is a specification:

This invention consists in exposing the beans, nuts, or other articles to be cleaned, to the action of steam in a revolving sieve, then applying magnesia, terra alba, flour, or other equivalent material in a powdered state, and finally removing the surplus powder by a current of steam.

In carrying out my invention, I place the beans, nuts, or other article in a sieve or perforated drum to which a revolving motion can be imparted, and while the screen is in motion I expose the beans or nuts to a jet of steam sufficient to sweat or moisten the same. By these means the beans or nuts are freed from impurities adhering to their surfaces, and, by the friction against each other, the surfaces are partially polished. When this has been accomplished, I add to the beans or nuts a quantity of magnesia, terra alba, flour, corn-starch, or other equivalent material, in a powdered state, keeping the screen in motion until the surfaces of all the beans or nuts are coated with the powder, which adheres thereto on account of the moisture previously produced on said surfaces by the jet of steam injected into the revolving screen. I then continue to revolve the screen until the surfaces of the beans or nuts appear glazed and polished, and, finally, I remove the surplus powder by injecting into the screen a jet of steam or an impelled current of air.

By this process I am enabled to impart to beans, pease, lentils, or nuts—such, for instance, as peanuts—a clean and fresh appearance, whereby their market value is materially increased.

What I claim as new, and desire to secure by Letters Patent, is—

The within-described process for cleaning and polishing beans, nuts, or other articles of a similar nature, by treating them, in a revolving screen, with jets of steam, and with magnesia or other equivalent material in a powdered state, substantially in the manner set forth.

In testimony that I claim the foregoing I have hereunto set my hand.

FREDERICK AKERS.

Witnesses:
 W. HAUFF,
 CHAS. WAHLERS.